Oct. 10, 1950  E. R. BLOUT ET AL  2,525,638
LIGHT FILTER TRANSPARENT TO INFRARED RADIATION
AND OPAQUE TO VISIBLE LIGHT
Filed March 5, 1946

INVENTORS
Elkan R. Blout
William J. Amon, Jr.
BY Donald L. Brown
Attorney

Patented Oct. 10, 1950

2,525,638

UNITED STATES PATENT OFFICE 2,525,638

LIGHT FILTER TRANSPARENT TO INFRARED RADIATION AND OPAQUE TO VISIBLE LIGHT

Elkan R. Blout, Cambridge, and William F. Amon, Jr., Boston, Mass., assignors to Polaroid Corporation, Cambridge, Mass., a corporation of Delaware Application March 5, 1946, Serial No. 652,157

1 Claim. (Cl. 88—109)

This invention relates to signal apparatus designed for signalling by means of infrared radiation at spectral regions invisible to the human eye and to selectively light-absorbing materials for use with such signal apparatus.

The particular object of the invention is to provide such apparatus embodying a source of heat and light radiations and having a light-filtering material which has increased absorption of visible light with increased transmission of infrared radiation, and has increased stability under adverse conditions of usage.

Another object is to provide such material in the form of sheets or films of polyvinyl alcohol dyed with one or more direct dyes, so chosen, with respect to their absorption characteristics, that either alone or in combination they substantially totally absorb visible light, but allow high transmission of infrared radiation.

Further objects provide an apparatus having a light-filtering material of the above characteristics wherein said plastic sheet comprises polyvinyl alcohol containing a direct dye, and said sheet is laminated to a sheet of glass having light-absorption characteristics permitting high transmission of infrared radiation.

The invention accordingly comprises the apparatus possessing the construction, combination of elements and arrangement of parts which are exemplified in the construction hereinafter described, and the scope of the application of which will be indicated in the claim.

Figure 1:
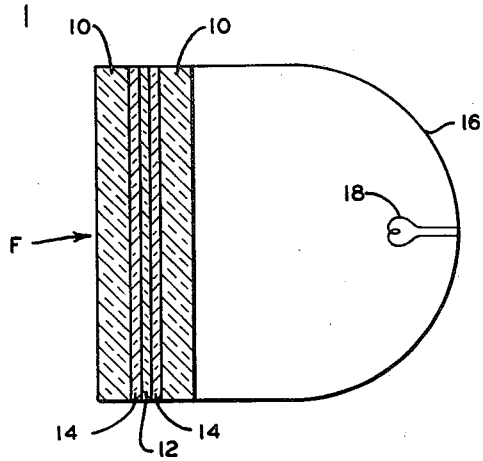
Figure 2:
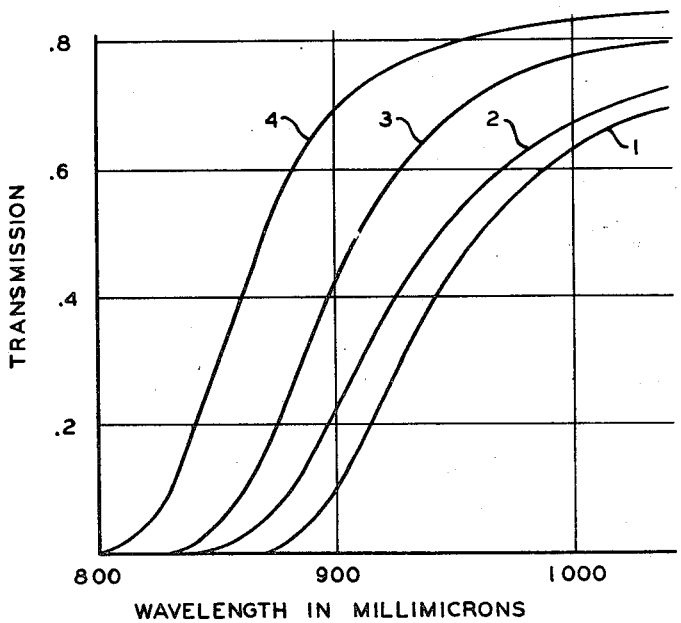

For a fuller understanding of the nature and objects of the invention, reference should be had to the following detailed description taken in connection with the accompanying drawings, wherein:

Figure 1 is a sectional view illustrating diagrammatically one embodiment of the invention; and Fig. 2 is a graph illustrating the light-transmitting properties of several embodiments of the invention.

In accordance with the present invention, it has been found possible to produce a light-filtering material having more uniform characteristics, greater stability and resistance to heat, a more complete cutoff of the visible light, and a sharper cutoff between visible radiations and infrared radiations than previously believed possible. In order to produce such an improved light-filtering material, it has been found that polyvinyl alcohol incorporating direct dyes gives the improved results. The direct dyes can be incorporated either by imbibition or by casting. Both processes are found to provide a filter material of excellent quality possessing the desired characteristics in regard to both spectral transmission and heat and light stability. Of the two methods, the casting method is preferred since it permits more accurate control of the ratio of the dye to the polyvinyl alcohol.

Of the various direct dyes which have been found satisfactory for the manufacture of a product having the improved results set forth in the above objects, the most satisfactory are as follows: Rayon Black GS produced by du Pont; Acid Black G manufactured by Ciba Company, Inc. (Color Index No. 247); Pontacyl Dark Green B produced by du Pont (Color Index No. 247); a mixture of Rayon Black GS and Amanil Fast Red FS (Color Index No. 419).

The above color indices are taken from the 1943 Year Book of the American Association of Textile Chemists and Colorists, vol. XX.

In Fig. 1, element 18 represents an incandescent lamp of relatively high wattage, such for example as a 500-watt bulb, mounted in any suitable reflecting housing 16 provided in front thereof with a light filter F. In accordance with the invention, housing 16 and filter F are so constructed and secured together as to be wholly light-tight except for such radiation as is transmitted by filter F. The present invention is particularly concerned with the production of devices of the type shown in Fig. 1, which can be used for secret signalling by means of the infrared radiation emitted by lamp 18 while at the same time none of the visible radiation from said lamp is permitted to escape and reveal the presence or operation of the device. This objective is complicated by the fact that the infrared radiation usually found most useful for signalling is in those regions of the spectrum closely adjacent the extreme red end of the visible spectrum. In order, therefore, to accomplish this objective, it is essential that filter F totally absorb visible light, but that its degree of transmission increase very sharply in the near infrared in order to transmit as much radiation as possible in that region. A further complication is the fact that since filter F will usually be used close to the lamp 18, and since the latter will emit a relatively high degree of heat, both the filter itself and the light-absorbing substance therein must possess maximum stability to heat. It is also highly desirable that filter F possess substantial stability against conditions of moisture, since the signalling devices of the invention will usually be used out-of-doors and frequently under adverse weather conditions.

Optical filters of the conventional types heretofore in use have been found totally unsuitable for the purposes of the invention. For example, gelatin filters of the Wratten type do not possess the necessary absorption for visible light. On the contrary, by the standards of the present invention, the most dense Wratten infrared filter transmits strongly at the far end of the visible red spectrum. Furthermore, gelatin filters do not possess heat stability to the degree desired in the pratice of the present invention. Previously available all-glass filters do not have desired properties due to the poor absorption qualities of the inorganic coloring agents.

Referring now to the light filter F of Fig. 1, there is shown a preferred form of the present invention. In this filter F there are provided two outer sheets of glass 10 adapted to form a protective covering for the polyvinyl alcohol filter. In some cases, one or more of these glass sheets may be provided with definite optical characteristics so as to improve the efficiency of the light filter and to alter its spectral characteristics to produce desired results as described in the copending application of William F. Amon, Jr., entitled Signalling Apparatus, Serial No. 652,158, filed March 5, 1946 (now abandoned). Between the glass layers 10, there is provided a direct dyed sheet 12 of polyvinyl alcohol. This is secured to sheets of glass 10 by means of suitable layers of adhesive 14, to form a composite lamination. This composite lamination is suitably mounted in the reflector 16 containing the source 18 of light and heat radiations. In the use of such a signalling apparatus, it has been found that the temperature in the neighborhood of the filter reaches values exceeding 100° C. With the filters of the past, such temperatures have been completely destructive to the filtering element.

The glass sheet 10 is preferably formed of a "water white" glass having a low iron content. Such a glass is particularly useful because of its high transmission in that range of the spectrum from 800 to 1000 millimicrons. A few examples of such glass are Kopp Glass; Pittsburgh Plate Glass Company, Water White Plate Glass #4; Libbey-Owens-Ford, Color-clear, Glazing, Quality X6; and J. R. Donelly Company, Water-White Glass.

It has been found that the spectral efficiency of the filter is considerably affected by the use of "green" glasses, i. e., those glasses which, when examined from the edge, exhibit a green color. This green color, which is caused by an appreciable iron content in the glass, acts to absorb a considerable portion of radiation above 800 millimicrons.

The direct dyed polyvinyl alcohol sheet 12 is preferably formed in the following manner: 20 grams of dry polyvinyl alcohol type RH391A, produced by the Arlington plant of the du Pont Company, are mixed with 150 cc. of cold water. This mixture is then heated to 100° C. in a water bath or on a steam cone for a period of one to two hours. An alternative method of effecting solution of polyvinyl alcohol is to maintain the above mixture at a temperature of approximately 70° C. for a period of about twelve hours. To the solution of polyvinyl alcohol prepared in either of the above two ways, a saturated water solution of the direct dye is added. The preferred ranges of concentration for the various dyes enumerated above are as follows:

| Dye | Dye added to polyvinyl alcohol | Polyvinyl alcohol film thickness, inches | Transmission compared with standard Photocell |
|---|---|---|---|
| | | | Per cent |
| Rayon Black GS | 6% | .0025 | 22 |
| | | .0052 | 15 |
| Rayon Black GS Purified | 4% | .0034 | 22 |
| | | .0042 | 18 |
| Acid Black G Purified | 7% | .004 | 73 |
| | | .007 | 64 |
| Do | 12% | .004 | 65 |
| | | .007 | 54 |
| Rayon Black GS and Amanil Fast Red FS | 2% of each | .004 | 49 |

The per cent transmission was measured with respect to a tungsten lamp source, operated at 2848° K. color temperature; a particular caesium surface photoelectric cell covered with a Wratten 87 film was used as a receiver so that the response peak of the photocell-filter combination occurred at 850 millimicrons. The per cent transmission of the filter under test was computed from the ratio of response of the standard receiver with the test filter interposed between the source and receiver to the response with the test filter removed.

The above mixtures of dyes are added to the polyvinyl alcohol at a temperature of from 70° to 100° C. and are thoroughly mixed therewith, such as by stirring for one to two minutes. The above mixture is then cast to give a sheet of the desired thickness.

For the lamination of the polyvinyl alcohol sheet 12 to the glass sheets 10 several adhesives and processes have been found satisfactory. The first of these involves the use of plasticized polyvinyl butyral in accordance with the process set forth in United States Patent No. 2,356,250.

The second possible method of forming laminations of the polyvinyl alcohol sheet to the glass sheets is by the use of Plexigum lamination, Plexigum being an acrylate resin. Plexigum-coated glass plates are sold by the American Window Glass Company and have the adhesive 14 secured to the sheet 10 as sold. One way of assembling these laminations is to heat the sheet of polyvinyl alcohol for at least half an hour at a temperature of 85° to 100° C. to remove moisture. The Plexigum layers are coated with a plasticizer such as dibutyl phthalate or dibutyl sebacate, and the whole assembly is laminated at a temperature of 100° to 105° C. and a pressure of approximately 5 to 10 pounds per square inch, for a time of 5 to 15 minutes. It has been found that pressure and heat are not essential to form the above lamination if the assembly is left standing for a period of 1 to 12 hours or more without being disturbed.

Another method of laminating the polyvinyl alcohol sheet to the glass sheets is by the use of commercially available, plasticized polyvinyl butyral films as the adhesive layers 14. Examples of these are "Saflex" and "Butacite." In this case a lamination is built up of a sheet of glass, a sheet of polyvinyl butyral, a sheet of dyed polyvinyl alcohol, a sheet of polyvinyl butyral, and another sheet of glass. This lamination is then autoclaved in oil at a temperature of 230° F. for a period of two hours under a pressure of 100 pounds per square inch. This lamination can also be autoclaved in air at a temperature of 235° F. for a period of four to five hours under a pressure of 75 pounds per square inch.

Another suitable method of using polyvinyl butyral as the adhesive layer, involving a suitable solvent plasticizer, is shown in United States patent application of Edwin H. Land et al., Serial No. 450,424, filed July 10, 1942, entitled Light Polarizer and Process of Manufacture, now abandoned.

In Fig. 2 there are shown several curves illustrative of the effects obtained by the novel filter of the present invention. The following information pertains to the curves of Fig. 2:

| Curve | Film Thickness | Transmission Comp. to Standard | pH | Start of Transmission |
|---|---|---|---|---|
| | Inches | Per cent | | Mu. |
| 1 | .0040 | 21 | 9.37 | 870 |
| 2 | .0045 | 26 | 11.25 | 840 |
| 3 | .0050 | 36 | 11.67 | 830 |

The above three curves are plotted for a polyvinyl alcohol film direct dyed with purified Rayon Black GS with a 4% concentration, by weight, of the dye being used.

Curve 4 of Fig. 2 shows a mixed dye of 2% Rayon Black GS and 2% Amanil Fast Red FS direct dyed in a polyvinyl alcohol film of .004" thickness. This filter has a per cent transmission compared with a standard of 49%. As can be seen from all of these curves, which are representative of other spectral curves obtained by these and other similar dyes, a steep curve is obtained which approaches more nearly the desired curve having an infinite slope in the range between 800 and 900 millimicrons. As also can be seen by these curves, with the concentration of dyes used, no visible light is passed by these filters, but a relatively high percentage, between 60 and 80% of nonvisible radiation, is passed, thus giving a filter of excellent spectral characteristics for use in apparatus such as secret signalling devices. It is apparent that it is feasible to adjust the concentration of the dyes, which is susceptible of exact control by the present process. Thus, the shape of the spectral curve of the resultant filter can be changed between certain limits, thereby shifting the curve in accordance with the requirements of light-sensitive devices, range of operation of signalling systems employing these filters, and the security dictated by the use of devices employing these filters. Thus, where a high transmission of light is required and security is not of the utmost importance, the concentration of the dye may be lessened, thereby moving the whole curve to the left as shown in Fig. 2. On the other hand, if the range of transmission of light is not the prime requisite, but rather security from detection is of utmost importance, the concentration of dyes may be increased, thus moving the whole spectral curve to the right as shown in Fig. 2.

It should be noted in connection with several of the curves shown in Fig. 2 that the pH of the dye, as added to the polyvinyl alcohol solution, has a considerable effect upon the spectral curve with a given concentration. This was found as the result of the purification of the dyes, wherein salts acting as precipitants were removed from the dyes in order to improve their optical characteristics. As an example of this, it was found that the Rayon Black GS as received from the manufacturer contained considerable quantites of sodium sulfate which had the effect of jelling the polyvinyl alcohol on casting, and gave considerable diffusion of the radiation passed therethrough, thus lowering the efficiency of the dyed filter.

A preferred method of purifying Rayon Black GS is to dissolve the crude dye in boiling water. This solution is then slowly acidified with dilute sulfuric acid while stirring. The precipitated dye is collected, using a vacuum filter, thus removing the large excess of dissolved salts. The precipitated dye is then washed well with a very dilute, hot sulfuric acid solution and then with water. The collected dye is then carefully neutralized in a water solution by the use of sodium hydroxide solution. The pure dye is then obtained by evaporation. It was found that the pH of the dye, as finally purified, was most efficient when an aqueous solution thereof had a pH ranging between 9 and 10. Solutions more alkaline than pH 10 caused severe jelling of polyvinyl alcohol when incorporated in a mix prepared for casting. Also, the cutoff point, that is, the zero transmission of radiation, moved closer to the visible range with increases of pH above pH 10.

In the purification of Acid Black G, it is also necessary to remove large amounts of salts which cause diffusion if not removed. In order to remove these salts, a procedure like the above is used. In the case of the Acid Black G dye, it was found that the pH of the dye when dissolved in water must be between 7.0 and 9.1 and preferably between 8 and 9 for the preparation of efficient filters.

When using very low concentrations of Rayon Black GS, it has been found that there is a certain leakage in the blue spectrum. Consequently any red dye, such as, for example, Amanil Fast Red FS, is added to the Rayon Black GS to prevent this blue leakage. It is essential that the dye chosen have no absorption in the infrared. Amanil Fast Red FS is one such dye that does not increase the absorption of the filter in the infrared spectrum but does make the filter completely opaque to visible light.

In order to improve the stability to water of the laminated filters produced in accordance with the above description, it has been found desirable to seal the edges of these filters when they are subjected to extremes of usage, such as by being used in the presence of hot salt-water sprays. It has been found that a satisfactory edge seal can be provided by coating the edges of the lamination with Melmac 599-8, a product of the American Cyanamid Chemical Corporation.

Since certain changes may be made in the above apparatus and different embodiments of the invention could be made without departing from the scope thereof, it is intended that all matter contained in the above description or shown in the accompanying drawings shall be interpreted as illustrative and not in a limiting sense.

What is claimed is:

A filter cutting off visible light but showing high transmission in the near infrared, said filter being stable to temperatures of the order of at least 100° C. and comprising a sheet of polyvinyl alcohol of a thickness at least of the order of .004 inch dyed with a dye identified by Color Index No. 247, the concentration of dye within said sheet being at least 4% by weight of said sheet, said dye in said concentration transmitting substantially no radiation below 800 millimicrons and having a transmission of at least 60% in the near infrared.

ELKAN R. BLOUT.
WILLIAM F. AMON, Jr.

REFERENCES CITED

The following references are of record in the file of this patent:

UNITED STATES PATENTS

| Number | Name | Date |
|---|---|---|
| 1,379,166 | Case | May 24, 1921 |
| 2,193,035 | Matthews et al. | Mar. 12, 1940 |
| 2,237,567 | Land | Apr. 8, 1941 |
| 2,360,280 | Rolph et al. | Oct. 10, 1944 |
| 2,416,392 | Hood | Feb. 25, 1947 |
| 2,418,605 | Shepherd et al. | Apr. 8, 1947 |
| 2,420,270 | Thomas | May 6, 1947 |